(12) United States Patent
Yoshida

(10) Patent No.: US 10,237,843 B2
(45) Date of Patent: Mar. 19, 2019

(54) VEHICLE-MOUNTED APPARATUS

(71) Applicant: Mitsubishi Electric Corporation, Tokyo (JP)

(72) Inventor: Yoshikazu Yoshida, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/757,485

(22) PCT Filed: Nov. 10, 2015

(86) PCT No.: PCT/JP2015/081592
§ 371 (c)(1),
(2) Date: Mar. 5, 2018

(87) PCT Pub. No.: WO2017/081743
PCT Pub. Date: May 18, 2017

(65) Prior Publication Data
US 2018/0249436 A1  Aug. 30, 2018

(51) Int. Cl.
*H04W 8/00* (2009.01)
*H04B 17/27* (2015.01)
*H04W 64/00* (2009.01)

(52) U.S. Cl.
CPC ............ *H04W 64/00* (2013.01); *H04B 17/27* (2015.01); *H04W 8/005* (2013.01)

(58) Field of Classification Search
CPC ..... H04W 12/02; H04W 4/005; H04W 4/008; H04W 4/025; H04W 4/046; H04W 4/70
See application file for complete search history.

(56) References Cited

U.S. PATENT DOCUMENTS

2008/0292146 A1* 11/2008 Breed .................... B60N 2/002
  382/118
2009/0092284 A1*  4/2009 Breed .................... B60J 10/00
  382/103

(Continued)

FOREIGN PATENT DOCUMENTS

JP    2009-140445 A    6/2009
JP    2009-177588 A    8/2009

(Continued)

OTHER PUBLICATIONS

International Search Report issued in PCT/JP2015/081592 (PCT/ISA/210), dated Dec. 8, 2015.

(Continued)

*Primary Examiner* — Diane D Mizrahi
(74) *Attorney, Agent, or Firm* — Birch, Stewart, Kolasch & Birch, LLP

(57) ABSTRACT

A position determining unit (4a) determines the position of each of wireless communication apparatuses carried into a vehicle cabin on the basis of the intensities of an electric wave which is transmitted by each wireless communication apparatus and is received by plural antennas (2), or on the basis of the difference between the intensities at the antennas of the electric wave which is transmitted by each wireless communication apparatus and is received by the plural antennas (2). By using a determination result outputted by the position determining unit (4a), a display control unit (4b) outputs, to a display unit (5), an image signal for showing the position in the vehicle cabin of each of the wireless communication apparatuses, and allowing the user to select a wireless communication apparatus which is to be wirelessly connected.

3 Claims, 7 Drawing Sheets

(56) References Cited

U.S. PATENT DOCUMENTS

2017/0187119 A1\* 6/2017 Kirino .................. H01Q 1/2291
2017/0187121 A1\* 6/2017 Kirino .................. H01Q 21/005
2018/0081048 A1\* 3/2018 Saitou .................... G01S 13/04

FOREIGN PATENT DOCUMENTS

| JP | 5141463 B2 | 2/2013 |
| --- | --- | --- |
| JP | 2013-247428 A | 12/2013 |
| JP | 2014-004860 A | 1/2014 |
| JP | 2015-52954 A | 3/2015 |
| JP | 2015-142159 A | 8/2015 |

OTHER PUBLICATIONS

Office Action dated Jul. 31, 2018 in corresponding Japanese Patent Application No. 2017-549895.

\* cited by examiner

FIG. 8

| Reception Intensity at Each Antenna | | Difference between Reception Intensities at Antennas 2a and 2b | | |
|---|---|---|---|---|
| Antenna 2a | Antenna 2b | Reception Intensity at Antenna 2a Is Greater than That at Antenna 2b by α or More | Difference Is Less than α | Reception Intensity at Antenna 2b Is Greater than That at Antenna 2a by α or More |
| Equal to or Greater than a | Equal to or Greater than a | A | B | C |
| Equal to or Greater than a | Less than a and Greater than b | A | E | ■ |
| Equal to or Greater than a | Equal to or Less than b | A | E | ■ |
| Less than a and Greater than b | Equal to or Greater than a | ■ | E | E or H |
| Less than a and Greater than b | Less than a and Greater than b | E or H | E or H | F or I |
| Less than a and Greater than b | Equal to or Less than b | A | F or H | ■ |
| Equal to or Less than b | Equal to or Greater than a | ■ | E | F or I |
| Equal to or Less than b | Less than a and Greater than b | ■ | D or H | — |
| Equal to or Less than b | Equal to or Less than b | D or G | D, F, or H | — |

P1, P2

VEHICLE-MOUNTED APPARATUS

TECHNICAL FIELD

The present invention relates to a vehicle-mounted apparatus that can make a wireless connection to a wireless communication apparatus carried into a vehicle cabin.

BACKGROUND ART

A vehicle-mounted apparatus that can make a wireless connection to a wireless communication apparatus, such as a mobile phone, which is carried into a vehicle cabin, by using short-range wireless communications, such as Bluetooth (registered trademark) and a wireless LAN is known. A user operates the vehicle-mounted apparatus to cause the vehicle-mounted apparatus to search for connectable wireless communication apparatuses when there is a wireless communication apparatus which the user wants to connect to the vehicle-mounted apparatus.

Incidentally, when plural wireless communication apparatuses which are wirelessly connectable exist in the surroundings of the vehicle-mounted apparatus, plural connection candidates are displayed for the user as a search result. At this time, the user needs to select a wireless communication apparatus which is desired to be connected from the displayed plural connection candidates. However, each of the connection candidates is indicated by a Service Set Identifier (SSID) or the like, so that the user cannot properly select the SSID corresponding to the wireless communication apparatus which is desired to be connected from displayed plural SSIDs unless, for example, the user looks up the SSID of the wireless communication apparatus which is desired to be connected in advance, and makes a memorandum of the SSID.

Therefore, it is desirable to be able to display the connection candidates for the user in a state where to which wireless communication apparatus each of the displayed connection candidates corresponds is easily recognized.

For example, in Patent Literature 1, a vehicle monitoring device that can determine a seat in which a mobile phone is positioned is described. If each connection candidate can be indicated, not by its SSID or the like, but by a position at which the connection candidate exists, it is easy for the user to select the candidate corresponding to the wireless communication apparatus which is desired to be connected from the displayed plural connection candidates.

CITATION LIST

Patent Literature

Patent Literature 1: Japanese Unexamined Patent Application Publication No. 2009-140445

SUMMARY OF INVENTION

Technical Problem

However, in the technique described in Patent Literature 1, in order to determine the seat in which the wireless communication apparatus is positioned, it is necessary to receive an electric wave of the mobile phone via an antenna which is installed while being brought into one-to-one correspondence with each of plural seats. For example, an antenna needs to be installed in the inside of a door for each seat. Therefore, antennas whose number is equal to the number of seats are needed, the seats being to be determined. Further, in the case in which an antenna is to be installed in the inside of a door, it is difficult to apply such a technique to a retrofitted type vehicle-mounted apparatus which can be purchased in a mass retailer, in addition to increase in the installation cost.

The present invention is made in order to solve the above-mentioned problems, and it is therefore an object of the present invention to provide a vehicle-mounted apparatus that can determine a position of a wireless communication apparatus without having to necessarily use an antenna which is provided while being brought into correspondence with a seat, and that makes it easy for the user to select, from display, a wireless communication apparatus which is desired to be wirelessly connected.

Solution to Problem

A vehicle-mounted apparatus according to the present invention includes: a position determiner to perform, for one or more wireless communication apparatuses which are wirelessly connectable, a process of determining a position in a vehicle cabin of each of the wireless communication apparatuses by using at least one of: intensities of an electric wave of each of the wireless communication apparatuses, the electric wave being received by plural antennas, and a difference between the intensities at the plural antennas; and a display controller to output an image signal for showing the position in the vehicle cabin of each of the wireless communication apparatuses and allowing selection of at least one of the wireless communication apparatuses which is to be wirelessly connected, by using a determination result acquired by the position determiner.

Advantageous Effects of Invention

According to the present invention, because the position determining unit is provided which determines the position in the vehicle cabin of each of the wireless communication apparatuses which are wirelessly connectable by using the intensities of the electric wave of each of the wireless communication apparatuses, the electric wave being received by the plural antennas, or by using the difference between the intensities at the antennas, it is possible to determine the position of each of the wireless communication apparatuses even if the antennas are provided while not being brought into correspondence with seats. Further, because the display control unit is provided which outputs the image signal for showing the position in the vehicle cabin of each of the wireless communication apparatuses and allowing the selection of the wireless communication apparatus which is to be wirelessly connected, by using the determination result of the position, it is easy for the user to select, from display, the wireless communication apparatus which is desired to be wirelessly connected.

BRIEF DESCRIPTION OF DRAWINGS

FIG. 8 is an example of position determination at a time of performing the determination by using results of the processing shown in FIGS. 6 and 7.

DESCRIPTION OF EMBODIMENTS

Hereafter, in order to explain this invention in greater detail, an embodiment of the present invention will be described with reference to the accompanying drawings.

Embodiment 1

Figure 1:
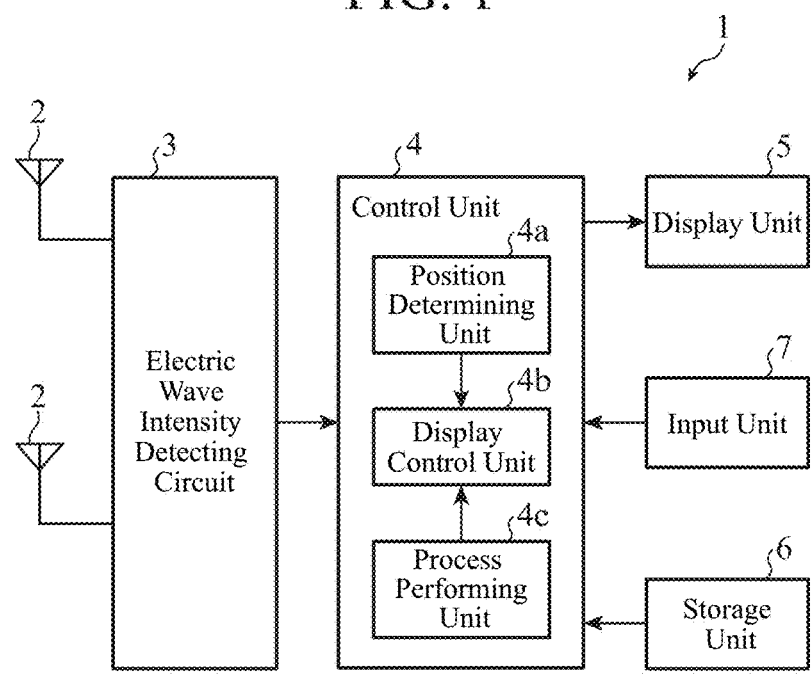
FIG. 1 is a block diagram showing the configuration of a vehicle-mounted apparatus according to Embodiment 1 of the present invention.

The configuration of vehicle-mounted apparatus 1 according to Embodiment 1 of the present invention is shown in FIG. 1.

The vehicle-mounted apparatus 1 can make a wireless connection to a wireless communication apparatus, such as a mobile phone, which is carried into a vehicle cabin, by using short-range wireless communications. Concretely, a car navigation apparatus, a display audio system, or the like is mentioned.

The vehicle-mounted apparatus 1 includes antennas 2, an electric wave intensity detecting circuit 3, a control unit 4, a display unit 5, a storage unit 6, and an input unit 7.

The plural antennas 2 are provided, and each of the antennas receives an electric wave transmitted by a wireless communication apparatus carried into the vehicle cabin and outputs a corresponding received signal to the electric wave intensity detecting circuit 3. Each of the antennas 2 can be contained inside a not-illustrated housing of the vehicle-mounted apparatus 1, or can be provided outside the housing and connected to the electric wave intensity detecting circuit 3 via a cable. The plural antennas 2 are provided at different locations from each other.

The electric wave intensity detecting circuit 3, when the received signal is inputted from each of the antennas 2, detects, for each of the antennas 2, the intensity of the received signal, i.e., the intensity of the electric wave received by the corresponding antenna 2. The electric wave intensity detecting circuit 3 then outputs both the received signal inputted from each of the antennas 2 and a result of the detection of the intensity of the received signal to the control unit 4.

The control unit 4 has a position determining unit 4a, a display control unit 4b, and a process performing unit 4c.

By using the intensities of the electric wave at the respective antennas 2, the intensities being detected by the electric wave intensity detecting circuit 3, or by using a difference between the intensities at the antennas, the position determining unit 4a determines the position in the vehicle cabin of the wireless communication apparatus which has transmitted the electric wave. The position determination by the position determining unit 4a is carried out on individual wireless communication apparatuses which are carried into the vehicle cabin. A result of the determination is outputted to the display control unit 4b.

The display control unit 4b generates an image signal by using the determination result outputted by the position determining unit 4a, and outputs the image signal to the display unit 5. This image signal is intended to show the position in the vehicle cabin of each of the wireless communication apparatuses, and allow a user to select a wireless communication apparatus which is to be wirelessly connected. The display control unit 4b also performs a process of receiving a process result acquired by the process performing unit 4c, generating an image signal for showing a route to a destination, a music playback screen, or the like, and outputting the image signal to the display unit 5.

The process performing unit 4c performs various types of processes, such as a process of establishing a wireless connection between the wireless communication apparatus selected by the user and the vehicle-mounted apparatus 1, a process of making a route search specified by the user, and a process of playing back a piece of music, in accordance with an operation signal outputted by the input unit 7. Results of these various types of processes are outputted to the display control unit 4b as appropriate.

Figure 9A:
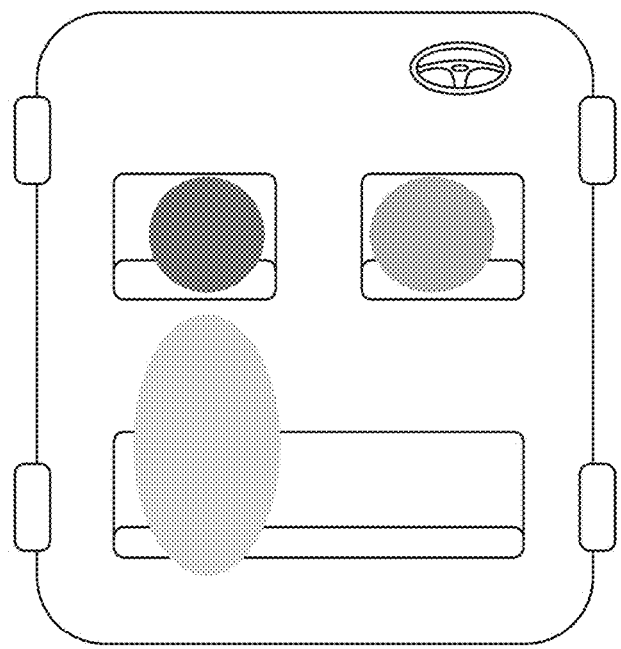
FIGS. 9A and 9B are examples of an image displayed on a display unit of the vehicle-mounted apparatus according to Embodiment 1 of the present invention.
Figure 9B:
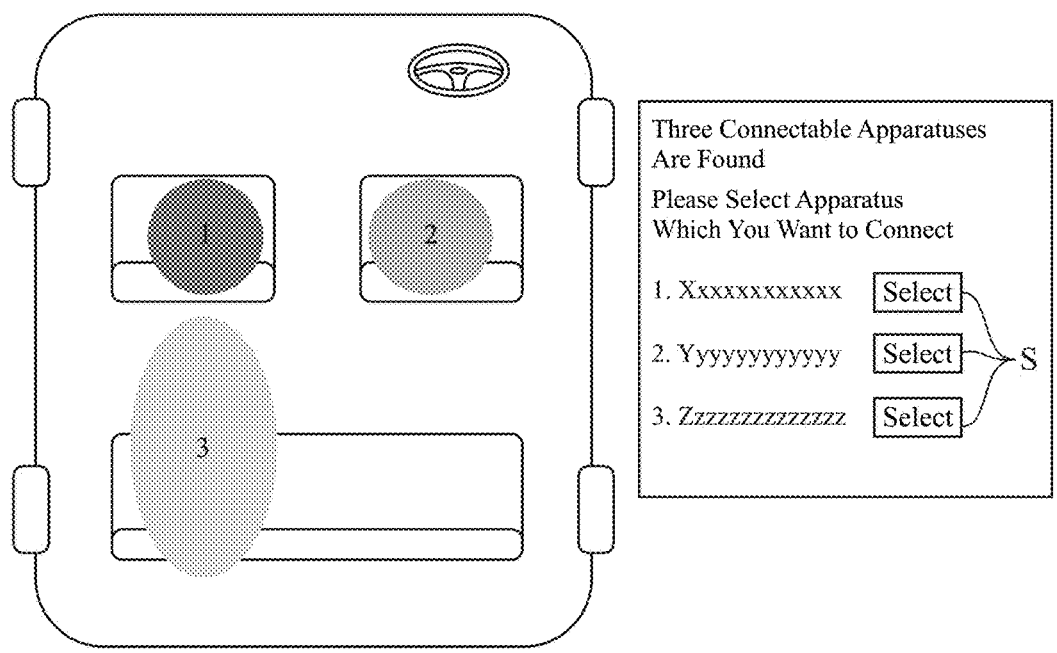

The display unit 5 displays an image indicated by the image signal outputted by the display control unit 4b. The display unit 5 is, for example, a liquid crystal display. For example, one of images as shown in FIGS. 9A and 9B which will be mentioned later is displayed.

The storage unit 6 stores information needed for processing carried out by the control unit 4. For example, the storage unit 6 stores a threshold used in processing carried out by the position determining unit 4a. The storage unit 6 also stores a vehicle cabin model image used in processing carried out by the display control unit 4b. The vehicle cabin model image shows, for example, a schematic plane view of the vehicle cabin. The storage unit 6 includes at least one of various types of memories.

The input unit 7 receives a user operation and outputs an operation signal indicating the descriptions of the operation to the control unit 4. The input unit 7 is a remote controller, a touch panel which is configured integrally with the display unit 5, or the like.

Figure 2:
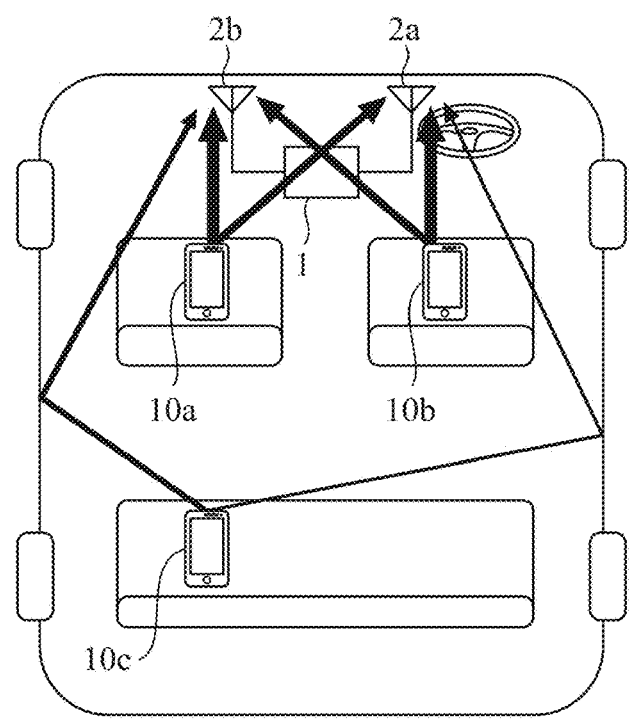
FIG. 2 is a plane view of a vehicle cabin, this view showing a situation in which an electric wave from each wireless communication apparatus is received by individual antennas of the vehicle-mounted apparatus according to Embodiment 1 of the present invention.

Hereafter, an overview of the position determination carried out by the position determining unit 4a will be explained by taking, as an example, a case as shown in FIG. 2 in which three wireless communication apparatuses 10a to 10c are carried into the vehicle cabin.

The vehicle-mounted apparatus 1 provided in a vehicle front portion has two antennas: an antenna 2a and an antenna 2b, and the antenna 2a is positioned on a side of the driver's seat while the antenna 2b is positioned on a side of the front passenger seat. The installation positions of the antennas 2a and 2b are an example, and are not limited to the illustrated example.

The wireless communication apparatus 10a exists in the front passenger seat, the wireless communication apparatus 10b exists in the driver's seat, and the wireless communication apparatus 10c exists on a side of a rear seat, this side being just behind the front passenger seat, i.e., on a left-hand side in the figure of the rear seat.

A path via which an electric wave transmitted by each of the wireless communication apparatuses 10a to 10c reaches one of the antennas 2a and 2b is shown by a corresponding arrow in FIG. 2. Further, the width of each arrow shown in FIG. 2 shows the intensity of the corresponding electric wave which is received by one of the antennas 2a and 2b. The paths and the intensities of the electric waves which are shown in FIG. 2 are only an example, and there may occur another state depending on the specifications of the respective wireless communication apparatuses 10a to 10c, the environment in the vehicle cabin, and so on.

The wireless communication apparatus 10a is disposed at a short distance from both of the antennas 2a and 2b, particularly from the antenna 2b. Therefore, an electric wave which is transmitted by the wireless communication apparatus 10a and is received by the antennas 2a and 2b has a very high reception intensity at the antenna 2b, and also has a high reception intensity at the antenna 2a which is not as high as that at the antenna 2b.

The wireless communication apparatus 10b is disposed at a short distance from both of the antennas 2a and 2b, particularly from the antenna 2a. Therefore, an electric wave which is transmitted by the wireless communication apparatus 10b and is received by the antennas 2a and 2b has a very high reception intensity at the antenna 2a, and also has a high reception intensity at the antenna 2b which is not as high as that at the antenna 2a.

An electric wave from the wireless communication apparatus 10c to the antennas 2a and 2b is blocked by the seat chassis of both the driver's seat and the front passenger seat. Therefore, the electric wave from the wireless communication apparatus 10c is not received directly by the antennas 2a and 2b, but is received by the antennas 2a and 2b after being reflected by the body chassis or the like of the vehicle. Because a path via which the electric wave reaches each of the antennas 2a and 2b is longer than those in the wireless communication apparatuses 10a and 10b, in addition to the fact that the electric wave is not received directly by the antennas 2a and 2b, a reception intensity at each of the antennas 2a and 2b of the electric wave transmitted by the wireless communication apparatus 10c is lower than those of the electric waves transmitted by the wireless communication apparatuses 10a and 10b. Further, because the path via which the electric wave reaches the antenna 2a is longer than the path via which the electric wave reaches the antenna 2b, the reception intensity at the antenna 2a is particularly low.

As mentioned above, the reception intensities at the antennas 2a and 2b of the electric waves transmitted by the wireless communication apparatuses 10a to 10c which are carried into the vehicle cabin exhibit various values depending on the positions at which the wireless communication apparatuses 10a to 10c exist. By using this fact, the position determining unit 4a determines the position of each of the wireless communication apparatuses carried into the vehicle cabin on the basis of the intensities of the electric wave which is transmitted by each of the wireless communication apparatuses and is received by the individual plural antennas 2, or on the basis of the difference between the intensities at the antennas of the electric wave which is transmitted by each of the wireless communication apparatuses and is received by the individual plural antennas 2.

The functions of the position determining unit 4a, the display control unit 4b, and the process performing unit 4c of the control unit 4 are implemented by a processing circuit. The processing circuit can be hardware for exclusive use, or a Central Processing Unit (CPU) that executes a program stored in a memory. The CPU is also called a central processing unit, a processing unit, an arithmetic device, a microprocessor, a microcomputer, a processor, or a Digital Signal Processor (DSP).

Figure 3A:
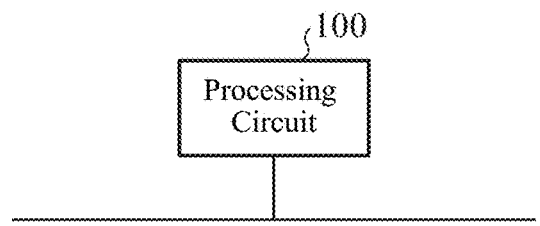
FIGS. 3A and 3B are diagrams each showing an example of the hardware configuration of a control unit of the vehicle-mounted apparatus according to Embodiment 1 of the present invention.

FIG. 3A is a diagram showing an example of a hardware configuration in a case in which the functions of the units included in the control unit 4 are implemented by a processing circuit 100 which is hardware for exclusive use. The processing circuit 100 is, for example, a single circuit, a composite circuit, a programmable processor, a parallel programmable processor, an Application Specific Integrated Circuit (ASIC), a Field Programmable Gate Array (FPGA), or a combination of two or more thereof. The functions of the position determining unit 4a, the display control unit 4b, and the process performing unit 4c can be implemented by a combination of two or more processing circuits 100, or the functions of the units can be implemented by a single processing circuit 100.

Figure 3B:
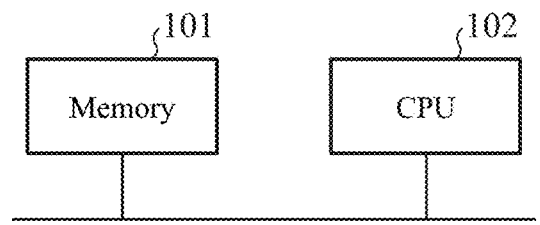

FIG. 3B is a diagram showing an example of a hardware configuration in a case in which the functions of the units included in the control unit 4 are implemented by a CPU 102 that executes a program stored in a memory 101. The memory 101 can constitute the storage unit 6. In this case, the functions of the position determining unit 4a, the display control unit 4b, and the process performing unit 4c are implemented by software, firmware, or a combination of software and firmware. The software and the firmware are described as programs and are stored in the memory 101. The CPU 102 implements the function of each of the units included in the control unit 4 by reading and executing a program stored in the memory 101. More specifically, the control unit 4 has the memory 101 for storing programs or the likes by which steps ST1 and ST2 shown in a flow chart of FIG. 4 which will be mentioned later, steps ST10 to ST22 shown in a flow chart of FIG. 6 which will be mentioned later, or steps ST30 to ST34 shown in a flow chart of FIG. 7 which will be mentioned later are performed as a result. Further, it can also be said that these programs cause a computer to execute a procedure or a method which each of the units included in the control unit 4 uses. The memory 101 is, for example, a non-volatile or volatile semiconductor memory, such as a RAM, a ROM, a flash memory, an Erasable Programmable ROM (EPROM), and an Electrically Erasable Programmable ROM (EEPROM), a magnetic disc, a flexible disc, an optical disc, a compact disc, a mini disc, or a Digital Versatile Disc (DVD).

A part of the functions of the units included in the control unit 4 can be implemented by hardware for exclusive use, and another part of the functions can be implemented by software or firmware. For example, the functions of the display control unit 4b and the process performing unit 4c can be implemented by a processing circuit as hardware for exclusive use, and the function of the position determining unit 4a can be implemented by causing a processing circuit to read and execute a program stored in a memory.

As mentioned above, the processing circuit can implement each of the above-mentioned functions of the control unit 4 by using hardware, software, firmware, or a combination of two or more thereof.

Next, processing which is carried out when the vehicle-mounted apparatus 1 configured as above makes a wireless connection to a wireless communication apparatus carried into the vehicle cabin will be explained.

In a state in which plural wireless communication apparatuses are carried into the vehicle cabin, when a user instructs the vehicle-mounted apparatus 1 to search for the wireless communication apparatuses via the input unit 7, the process performing unit 4c transmits a response requiring signal to each of the wireless communication apparatuses via the antennas 2. Each wireless communication apparatus which has received the response requiring signal generates a signal including identification information, such as its own SSID, and transmits the signal as an electric wave.

Each of the plural antennas 2 receives the electric wave transmitted by each wireless communication apparatus, and outputs a corresponding received signal to the electric wave intensity detecting circuit 3. The electric wave intensity detecting circuit 3 detects the intensity of the received signal inputted thereto, and outputs the received signal, together with a result of the detection, to the control unit 4. The received signal includes identification information, such as the SSID of the corresponding wireless communication apparatus which is the transmission source, which makes it possible to identify the corresponding wireless communication apparatus.

Figure 4:
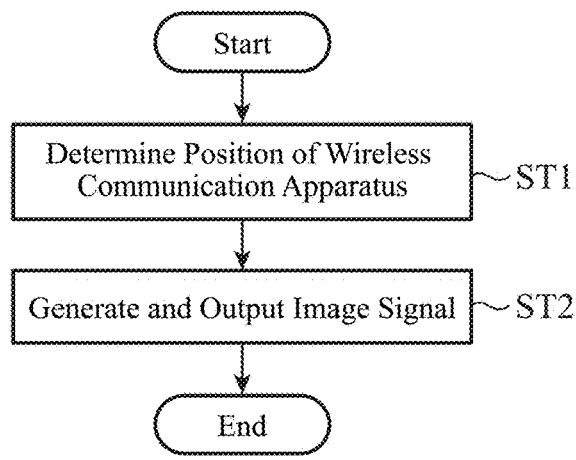
FIG. 4 is a flow chart showing processing carried out by the control unit of the vehicle-mounted apparatus according to Embodiment 1 of the present invention.

Hereafter, the processing carried out by the control unit 4 will be explained using the flow chart shown in FIG. 4.

First, the position determining unit 4a determines the position of each wireless communication apparatus by using the reception intensities at the antennas 2 of the electric wave transmitted by each wireless communication apparatus (step ST1). At this time, the position determining unit 4a carries out the determination by using the reception intensities themselves of the electric wave, or by using the difference between the reception intensities at the antennas of the electric wave. Further, by using the identification information indicated by the received signal which the electric wave intensity detecting circuit 3 outputs together with the detection result, it is possible to identify from which wireless communication apparatus the electric wave with the intensities originates, and the position determination by the position determining unit 4a is carried out on each wireless communication apparatus. A result of the position determination is outputted to the display control unit 4b.

Next, the display control unit 4b generates an image signal for showing the position in the vehicle cabin of each wireless communication apparatus and allowing the user to select a wireless communication apparatus which is to be wirelessly connected, by using the determination result outputted by the position determining unit 4a, and outputs the image signal to the display unit 5 (step ST2).

The user views an image displayed on the display unit 5 and selects a wireless communication apparatus which is desired to be connected. The user's selection is inputted, as an operation signal, to the process performing unit 4c by the input unit 7, and the process performing unit 4c performs a process of establishing a wireless connection between the wireless communication apparatus selected by the user and the vehicle-mounted apparatus 1.

Figure 5:
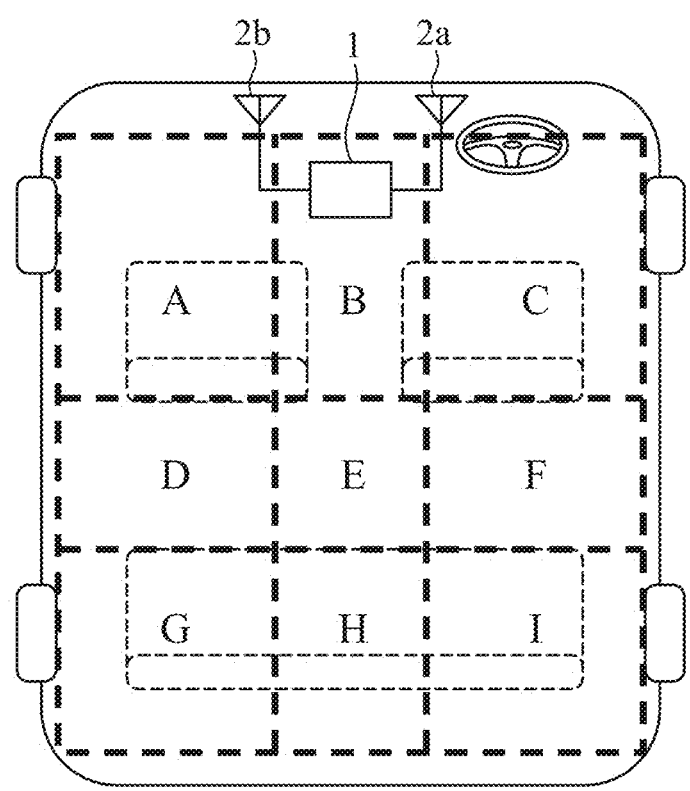
FIG. 5 is a plane view of the vehicle cabin, this view showing an example of partition of the vehicle cabin at a time of performing determination of the position of each wireless communication apparatus.

The process in step ST1 will be explained below in detail by taking, as an example, a case in which the inside of the vehicle cabin is partitioned into nine areas A to I, as shown in FIG. 5, and the process is performed. It is preferable to decide into how many areas the inside of the vehicle cabin is partitioned, as appropriate, in consideration of the size of the vehicle, the number of seats, and so on.

First, an example of the case of carrying out the position determination by using the intensities themselves of electric waves will be explained using the flow chart shown in FIG. 6. This position determination is sequentially carried out on each of the wireless communication apparatuses, and the position of each of the wireless communication apparatuses is determined.

The position determining unit 4a determines, for the wireless communication apparatus which is the current target for the determination, whether or not both the reception intensities at the antennas 2a and 2b are equal to or greater than a first threshold a (step ST10).

When both the reception intensities at the antennas 2a and 2b are equal to or greater than the first threshold a (YES in step ST10), the position determining unit 4a determines that the wireless communication apparatus which is the current target for the determination exists in the area A, B, or C (step ST11). The first threshold a is set, as appropriate, in consideration of the intensities of an electric wave which should be received by the antennas 2a and 2b when the wireless communication apparatus exists in the area A, B, or C which is close to the antennas 2a and 2b, and from which the electric wave directly reaches the antennas 2a and 2b.

When the reception intensity at at least one of the antennas 2a and 2b is less than the first threshold a (NO in step ST10), the position determining unit 4a determines whether or not only the reception intensity at the antenna 2a is equal to or greater than the first threshold a (step ST12).

When only the reception intensity at the antenna 2a is equal to or greater than the first threshold a (YES in step ST12), the position determining unit 4a determines that the wireless communication apparatus exists in the area C or E (step ST13). This is because although there first arises a possibility of existing in the area C, F, or I on a side of the driver's seat, i.e., on a right-hand side of FIG. 5 when only the reception intensity at the antenna 2a is equal to or greater than the first threshold a, it is assumed that in the case of the area F or I, the electric wave to the antenna 2a is blocked by the seat chassis of the driver's seat and therefore the reception intensity at the antenna 2a is not high. Further, that is because it is assumed that when the wireless communication apparatus whose transmitting antenna has the directivity accidentally oriented toward the antenna 2a exists in the area E, there is also a possibility that the electric wave passes through between the driver's seat and the front passenger seat, and therefore the reception intensity at the antenna 2a is equal to or greater than the first threshold a. Because when the wireless communication apparatus exists in the area A or B, the reception intensity at the antenna 2b should also be equal to or greater than the first threshold a, the areas A and B are not included in the determination result acquired in step ST13.

When the reception intensity at the antenna 2a is less than the first threshold a (NO in step ST12), the position determining unit 4a determines whether or not only the reception intensity at the antenna 2b is equal to or greater than the first threshold a (step ST14).

When only the reception intensity at the antenna 2b is equal to or greater than the first threshold a (YES in step ST14), the position determining unit 4a determines that the wireless communication apparatus exists in the area A or E (step ST15). This is because it is assumed that the same reason as that described in step ST13 exists.

When both the reception intensities at the antennas 2a and 2b are less than the first threshold a (NO in step ST14), the position determining unit 4a determines whether or not both the reception intensities at the antennas 2a and 2b are equal to or less than a second threshold b (step ST16). The second threshold b is less than the first threshold a.

When both the reception intensities at the antennas 2a and 2b are equal to or less than the second threshold b (YES in step ST16), the position determining unit 4a determines that the wireless communication apparatus exists in the area D, F, G, H, or I (step ST17). The second threshold b is set, as appropriate, in consideration of the intensities of an electric wave which should be received by the antennas 2a and 2b when the wireless communication apparatus exists in the area D, F, G, H, or I which is far from the antennas 2a and 2b, or from which the electric wave reaches after being reflected by the body chassis or the like of the vehicle. The area E is not included in the determination result acquired in step ST17, because it is assumed that there is a possibility that the electric wave passes through between the driver's seat and the front passenger seat and then reaches the antennas 2a and 2b.

When the reception intensity at at least one of the antennas 2a and 2b is less than the first threshold a and greater than the second threshold b (NO in step ST16), the position determining unit 4a determines whether or not only the reception intensity at the antenna 2a is equal to or less than the second threshold b (step ST18).

When only the reception intensity at the antenna 2a is equal to or less than the second threshold b (YES in step ST18), the position determining unit 4a determines that the wireless communication apparatus exists in the area D, G, or H (step ST19). This is because it is assumed that when only the reception intensity at the antenna 2a is equal to or less than the second threshold b, there is a high possibility of existing in the area D or G, other than the area A, on a side of the front passenger seat, i.e., on a left-hand side of FIG. 5. Further, that is because it is assumed that when the wireless communication apparatus whose transmitting antenna has the directivity accidentally oriented toward the antenna 2b exists in the area H, there is also a possibility that the electric wave passes through between the driver's seat and the front passenger seat, and therefore the reception intensity at the antenna 2b is greater than the second threshold b and the reception intensity at the antenna 2a is equal to or less than the second threshold b.

When the reception intensity at the antenna 2a is less than the first threshold a and greater than the second threshold b (NO in step ST18), the position determining unit 4a determines whether or not only the reception intensity at the antenna 2b is equal to or less than the second threshold b (step ST20).

When only the reception intensity at the antenna 2b is equal to or less than the second threshold b (YES in step ST20), the position determining unit 4a determines that the wireless communication apparatus exists in the area F, H, or I (step ST21). This is because it is assumed that the same reason as that described in step ST19 exists.

When both the reception intensities at the antennas 2a and 2b are less than the first threshold a and greater than the second threshold b (NO in step ST20), the position determining unit 4a determines that the wireless communication apparatus exists in the area E or H (step ST22). This is because although when the wireless communication apparatus exists in the area E or H, the reception intensities at the antennas 2a and 2b are not equal to or greater than the first threshold a due to a distance to the antennas 2a and 2b being not necessarily short, it is assumed that there is a possibility that the electric wave passes through between the driver's seat and the front passenger seat, and therefore the reception intensities at the antennas 2a and 2b are greater than the second threshold b which is less than the first threshold a.

In this way, the position determining unit 4a can determine the approximate position in the vehicle cabin of the wireless communication apparatus by using the reception intensities themselves at the antennas 2a and 2b.

Next, an example of the case of carrying out the position determination by using, instead of the reception intensities themselves, the difference between the reception intensities at the antennas will be explained using the flow chart shown in FIG. 7. This position determination is sequentially carried out on each of the wireless communication apparatuses, and the position of each of the wireless communication apparatuses is determined.

The position determining unit 4a determines, for the wireless communication apparatus which is the current target for the determination, whether or not the reception intensity at the antenna 2b is greater than that at the antenna 2a by a third threshold a or more (step ST30).

When the reception intensity at the antenna 2b is greater than that at the antenna 2a by the third threshold a or more (YES in step ST30), the position determining unit 4a determines that the wireless communication apparatus which is the current target for the determination exists in the area A, D, or G on a side of the front passenger seat, i.e., on a left-hand side of FIG. 5 (step ST31).

When the reception intensity at the antenna 2b is not greater than that at the antenna 2a by the third threshold a or more (NO in step ST30), the position determining unit 4a determines whether or not the reception intensity at the antenna 2a is greater than that at the antenna 2b by the third threshold a or more (step ST32).

When the reception intensity at the antenna 2a is greater than that at the antenna 2b by the third threshold a or more (YES in step ST32), the position determining unit 4a determines that the wireless communication apparatus exists in the area C, F, or I on a side of the driver's seat, i.e., on a right-hand side of FIG. 5 (step ST33). The third threshold a is set, as appropriate, in consideration of both a difference which should appear between the reception intensity at the antenna 2a and that at the antenna 2b when the wireless communication apparatus exists in the area C, F, or aside of the driver's seat, and a difference which should appear between the reception intensity at the antenna 2a and that at the antenna 2b when the wireless communication apparatus exists in the area A, D, or G on a side of the front passenger seat.

When the reception intensity at the antenna 2a is not greater than that at the antenna 2b by the third threshold a or more (NO in step ST32), the position determining unit 4a determines that the wireless communication apparatus exists in the area B, D, E, F, or H (step ST34). This is because it is assumed that when the wireless communication apparatus exists in the area B, E, or H, there is not a large difference between the reception intensity at the antenna 2a and that at the antenna 2b. Further, that is because it is assumed that even when the wireless communication apparatus exists in the area D or F, there is a possibility that if the wireless communication apparatus exists at a user's feet or in a bag, the reception intensities decrease greatly at both the antennas 2a and 2b, so that there is not a large difference between the reception intensity at the antenna 2a and that at the antenna 2b.

In this way, the position determining unit 4a can determine the approximate position in the vehicle cabin of the wireless communication apparatus even by using the difference between the reception intensities at the antennas.

Figure 6:
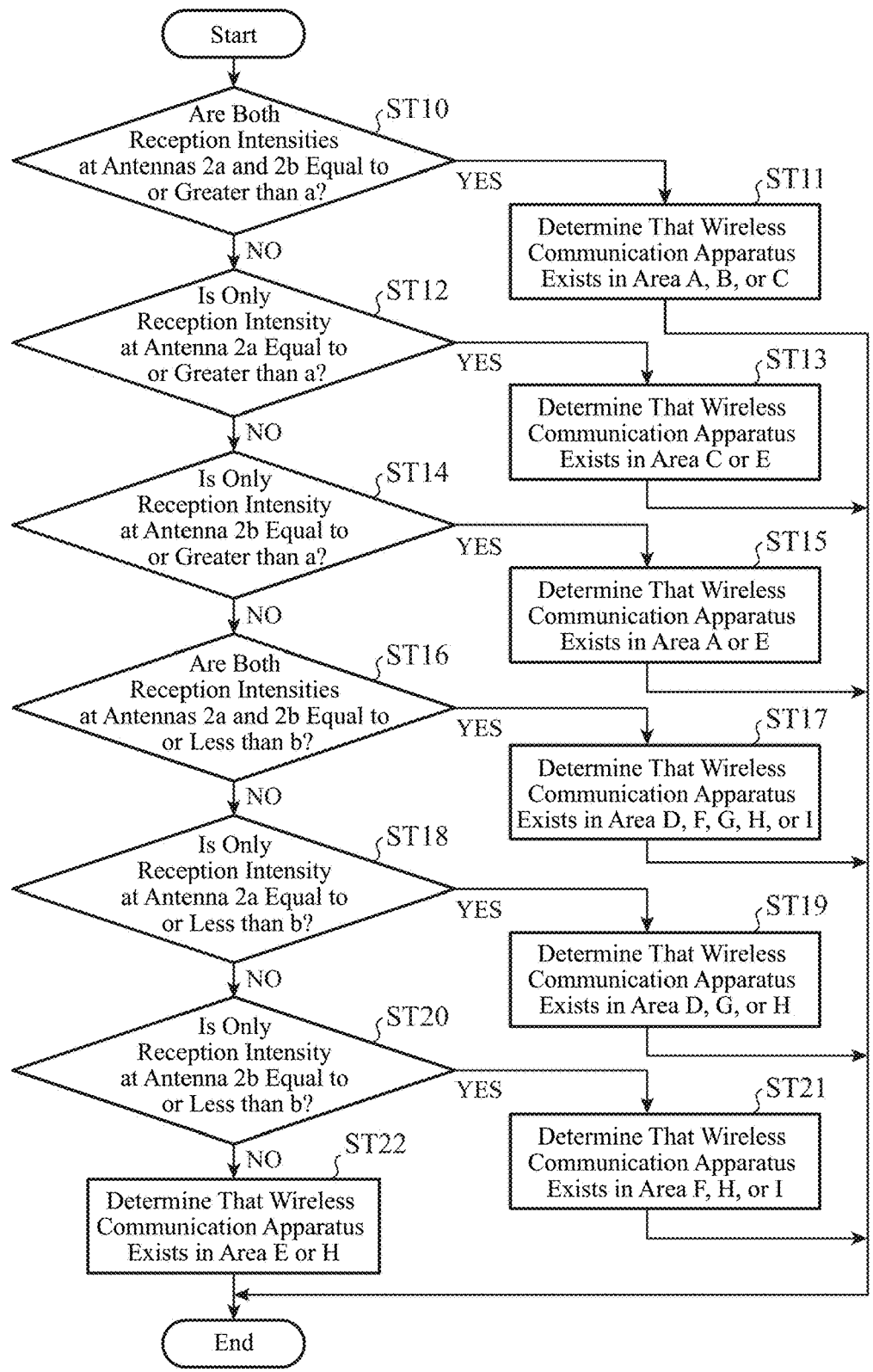
FIG. 6 is a flow chart showing the details of processing carried out by a position determining unit of the vehicle-mounted apparatus according to Embodiment 1 of the present invention.
Figure 7:
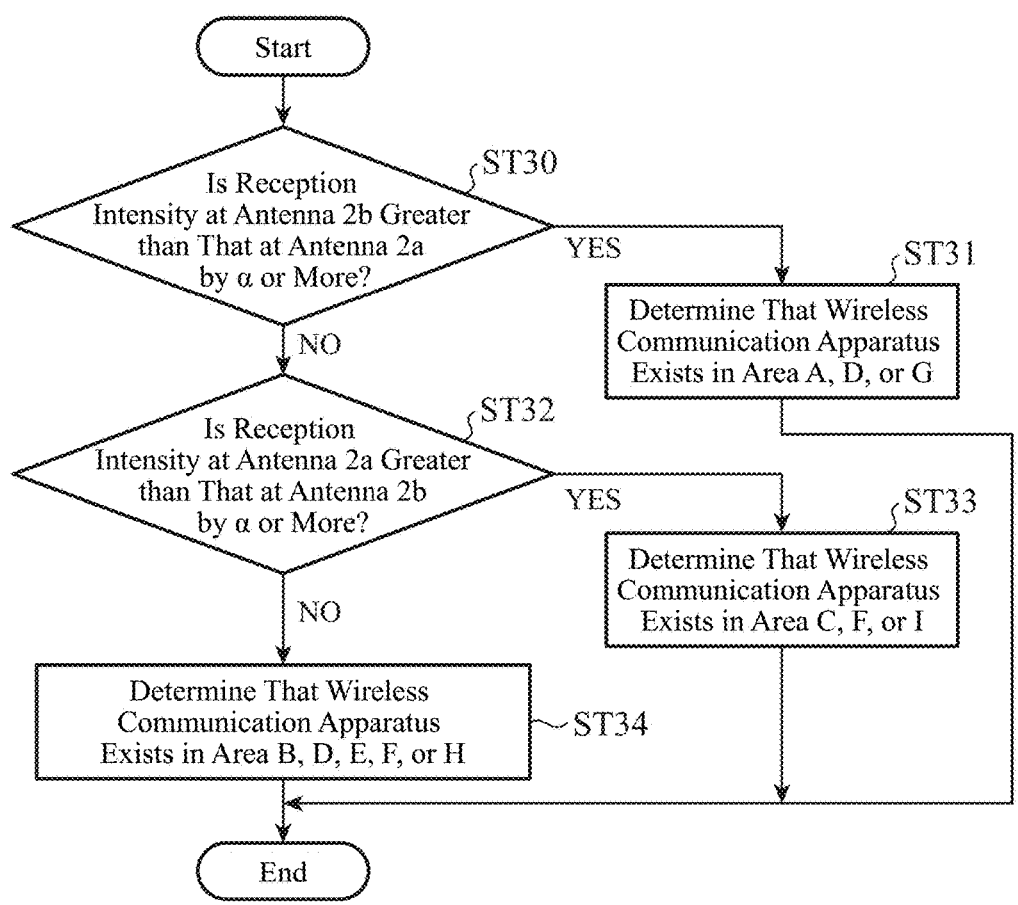
FIG. 7 is a flow chart showing the details of the processing carried out by the position determining unit of the vehicle-mounted apparatus according to Embodiment 1 of the present invention.

By using both a result which is acquired by carrying out the position determination using the reception intensities themselves as shown in FIG. 6, and a result which is acquired by carrying out the position determination using the difference between the reception intensities at the antennas as shown in FIG. 7, the position determining unit 4a can further narrow down the position of the wireless communication apparatus. More specifically, the position determining unit 4a can derive a logical AND of the areas determined in the flow chart shown in FIG. 6 and the areas determined in the flow chart shown in FIG. 7. The areas after narrowing down in this case are shown in FIG. 8 as a table. Each solid filled box shown in FIG. 8 indicates a combination which is impossible theoretically. Further, in combinations P1 and P2 shown in FIG. 8, no logical AND of the areas determined in the flow chart shown in FIG. 6 and the areas determined in the flowchart shown in FIG. 7 exists. In such a case, it can be considered to prioritize the determination result acquired in the flow chart shown in FIG. 6. More specifically, in the combination P1 in which the area E or H is determined in the flow chart shown in FIG. 6 and the area A, D, or G is determined in the flow chart shown in FIG. 7, the determination result which indicates the area E or H and which is acquired in the flowchart shown in FIG. 6 is accepted. This is because it is assumed that in the flow chart shown in FIG. 6 the determination is carried out using the absolute values which are the reception intensities themselves at the antennas 2a and 2b, whereas in the flow chart shown in FIG. 7 the determination is carried out using the relative value which is the difference between the reception intensities at the antennas, and therefore the determination result acquired in the flow chart shown in FIG. 6 has higher accuracy.

In FIGS. 9A and 9B, examples of an image which is displayed on the display unit 5 on the basis of the image signal which the display control unit 4b outputs in step ST2 are shown. These images are ones each of which is displayed when three wireless communication apparatuses are carried into the vehicle cabin, and it is determined in the process of step ST1 that one of them exists in the area A, another one exists in the area C, and the other one exists in the area D or G.

The display control unit 4b receives the determination result acquired by the position determining unit 4a, generates an image in which the position information about each wireless communication apparatus is superimposed onto the vehicle cabin model image stored in the storage unit 6, and outputs the image as an image signal. The image displayed by the display unit 5 in this case is, for example, the one as shown in FIG. 9A. One circular icon is displayed in the area A, one circular icon is displayed in the area C, and one elliptical icon is displayed to extend from the area D to the area G in such a way that the positions of the three wireless communication apparatuses are indicated by the respective icons. The icons are displayed in respective different display colors in such a way that the icons are easily distinguished from one another.

In the case in which the input unit 7 is a touch panel which is configured integrally with the display unit 5, the user touches the icon displayed in the area corresponding to the location where the wireless communication apparatus which is desired to be connected exists. As a result, the process performing unit 4c starts a process of making a connection to the wireless communication apparatus which the user has selected. In the case in which the input unit 7 is a remote controller, it can be configured to enable the user to select the icon corresponding to the wireless communication apparatus which is desired to be connected, for example, by operating a cursor appearing on the image using the remote controller. Even though a determination result cannot be narrowed down to a single area through the determination by the position determining unit 4a, so that the elliptical icon is displayed to extend from the area D and the area G, the user can easily judge which one of the three wireless communication apparatuses carried corresponds to the icon.

Further, the display control unit 4b receives the determination result acquired by the position determining unit 4a, generates an image in which the vehicle cabin model image onto which the position information about each wireless communication apparatus is superimposed, and an image showing a list of the wireless communication apparatuses are combined, and outputs the composite image as an image signal. The image displayed by the display unit 5 in this case is, for example, the one as shown in FIG. 9B. While the positions in the vehicle cabin of the wireless communication apparatuses are shown, the pieces of identification information about the wireless communication apparatuses existing at the respective positions, for example, SSIDs are displayed in a list. In this way, the user is enabled to perform an operation of selecting the wireless communication apparatus which is desired to be connected while checking the pieces of identification information about the wireless communication apparatuses.

When the image as shown in FIG. 9B is displayed, the user selects a selection icon S corresponding to the wireless communication apparatus which is desired to be connected by performing a touching operation, an operation on the remote controller, or the like. As a result, the process performing unit 4c is caused to start a process of making a connection to the selected wireless communication apparatus. As an alternative, like in the case of FIG. 9A, an icon displayed in an area corresponding to the location where the wireless communication apparatus which is desired to be connected exists can be selected. In FIG. 9B, although the pieces of identification information about the respective wireless communication apparatuses are displayed in a list, the pieces of identification information about the wireless communication apparatuses can be superimposed onto the respective areas in which the wireless communication apparatuses are determined to exist, instead of displaying in a list.

When the wireless communication apparatus to which the user wants to make a connection exists close to any other wireless communication apparatus, the position determining unit 4a determines, in its position determination, that plural wireless communication apparatuses exist in the same area. Then, an image is displayed on the display unit 5 in a state in which, for example, plural icons indicating the respective wireless communication apparatuses overlap one another in the same area. At this time, on the basis of the actual position at which the wireless communication apparatus which is desired to be connected exists, the user can judge one of the plural icons overlappedly displayed corresponds to the wireless communication apparatus. In order to, in this state, specify the icon corresponding to the wireless communication apparatus which is desired to be connected, the user should just move the wireless communication apparatus which is desired to be connected. Then, because the icon corresponding to the wireless communication apparatus which is desired to be connected also moves on the image displayed on the display unit 5, the user can find the icon which should be selected.

This processing can be implemented by, in the position determining unit 4a and the display control unit 4b, repeatedly performing the processes in the steps ST1 and ST2 until the user selects one of the icons. As an alternative, the processing can be handled also by providing an instruction to perform the processes in the steps ST1 and ST2 again for the vehicle-mounted apparatus 1 via the input unit 7, after the user moves the wireless communication apparatus which is desired to be connected away from any other wireless communication apparatus.

The above explanation is made by taking, as an example, the case in which the two antennas 2 are provided. However, three or more antennas 2 can be provided. The position determining unit 4a can further narrow down the location where each wireless communication apparatus exists with an increase in the number of antennas 2, and then carry out the determination. For example, an existing antenna provided in the vehicle cabin can be used as a third antenna 2. As a matter of course, a third antenna can be provided for the vehicle-mounted apparatus 1. By equipping the vehicle-mounted apparatus 1 with all the antennas 2, it is unnecessary to, for example, install any additional antenna in the vehicle, and perform an operation of wiring between an existing antenna and the vehicle-mounted apparatus 1, and therefore the cost can be reduced.

Further, the above explanation is made by taking, as an example, the case in which the position determining unit 4a and the display control unit 4b are provided integrally with an apparatus, such as a car navigation apparatus and a display audio system. The position determining unit 4a and the display control unit 4b should just be configured so as to be able to carry out transmission and reception of signals with the electric wave intensity detecting circuit 3, the display unit 5, and the storage unit 6. Thus, a single vehicle-mounted apparatus can be configured by only the position determining unit 4a and the display control unit 4b.

As mentioned above, in the vehicle-mounted apparatus 1 according to this Embodiment 1, because the position determining unit 4a determines the position of each of the plural wireless communication apparatuses carried into the vehicle cabin on the basis of the intensities of the electric wave which is transmitted by each of the wireless communication apparatuses and is received by the individual plural antennas 2, or on the basis of the difference between the intensities at the antennas of the electric wave which is transmitted by each of the wireless communication apparatuses and is received by the individual plural antennas 2, it is possible to determine the position of each of the wireless communication apparatuses even though the antennas 2 are provided while not being brought into correspondence with seats. Then, because by using the determination result outputted by the position determining unit 4a, the display control unit 4b outputs, to the display unit 5, an image signal for showing the position in the vehicle cabin of each of the plural wireless communication apparatuses, and allowing the user to select a wireless communication apparatus which is to be wirelessly connected, it is easy for the user to select, from display, a wireless communication apparatus which is desired to be wirelessly connected.

Further, the position determining unit 4a can determine the position by using both the intensities of the electric wave and the difference between the intensities at the plural antennas. Therefore, the position of each of the wireless communication apparatuses is further narrowed down and determined.

Further, the display control unit 4b can output the image signal for also showing the identification information about each of the plural wireless communication apparatuses. Therefore, the user can perform the operation of selecting the wireless communication apparatus which is desired to be connected while checking the identification information about each of the wireless communication apparatuses.

It is to be understood that various changes can be made in any component according to the embodiment, and any component according to the embodiment can be omitted within the scope of the invention.

INDUSTRIAL APPLICABILITY

As mentioned above, because the vehicle-mounted apparatus according to the present invention can determine a position of a wireless communication apparatus even though antennas are provided while not being brought into correspondence with seats, and makes it easy for the user to select, from display, a wireless communication apparatus which is desired to be wirelessly connected, the vehicle-mounted apparatus is suitable for being mounted and used in a vehicle in which it is difficult to install antennas while bringing these antennas into correspondence with seats.

REFERENCE SIGNS LIST 1 vehicle-mounted apparatus, 2, 2a, 2b antenna, 3 electric wave intensity detecting circuit, 4 control unit, 4a position determining unit, 4b display control unit, 4c process performing unit, 5 display unit, 6 storage unit, 7 input unit, 10a, 10b, 10c wireless communication apparatus, 100 processing circuit, 101 memory, and 102 CPU.

The invention claimed is:
1. A vehicle-mounted apparatus comprising:
plural antennas configured to receive electric waves from wireless communication apparatuses within a vehicle cabin;
a position determiner that determines a position in the vehicle cabin of each of the wireless communication apparatuses using at least one of:
intensities of an electric wave of each of the wireless communication apparatuses received by the plural antennas, and
a difference between the intensities at the plural antennas; and
a display controller configured to use the determined positions to output an image signal that when processed by a display shows the position of each of the wireless communication apparatuses within the vehicle cabin and allows a user to select one of wireless communication apparatuses with which a wireless connection is to be established.
2. The vehicle-mounted apparatus according to claim 1, wherein the position determiner determines the position using both the intensities of the electric wave and the difference between the intensities at the plural antennas.
3. The vehicle-mounted apparatus according to claim 1, wherein the image signal output by the display controller further displays identification information about each of the wireless communication apparatuses.

* * * * *